(12) United States Patent
Tateno (10) Patent No.: US 10,083,512 B2
(45) Date of Patent: Sep. 25, 2018

(54) INFORMATION PROCESSING APPARATUS, INFORMATION PROCESSING METHOD, POSITION AND ORIENTATION ESTIMATION APPARATUS, AND ROBOT SYSTEM

(71) Applicant: CANON KABUSHIKI KAISHA, Tokyo (JP)

(72) Inventor: Keisuke Tateno, Munich (DE)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/661,859

(22) Filed: Mar. 18, 2015

(65) Prior Publication Data

US 2015/0269735 A1 Sep. 24, 2015

(30) Foreign Application Priority Data

Mar. 20, 2014 (JP) .................................. 2014-058490

(51) Int. Cl.
*G06T 7/00* (2017.01)
*G06K 9/00* (2006.01)
(Continued)

(52) U.S. Cl.
CPC ........ *G06T 7/0046* (2013.01); *G06K 9/00201* (2013.01); *G06K 9/38* (2013.01);
(Continued)

(58) Field of Classification Search
CPC ........... G06T 2207/30164; G06T 5/002; G06T 7/0008; G06T 7/001; G06T 7/0042;
(Continued)

(56) References Cited

U.S. PATENT DOCUMENTS 6,335,985 B1 * 1/2002 Sambonsugi ........ G06K 9/3241
382/190
2009/0010546 A1 * 1/2009 Rossato ................... G06K 9/38
382/199
(Continued)

FOREIGN PATENT DOCUMENTS

JP S60-105081 A 6/1985
JP 2010267231 A 11/2010
(Continued)

OTHER PUBLICATIONS

C. Harris and M. Stephens, "A combined corner and edge detector," Proc. 4th Alvey Vision Conf., pp. 147-151, Manchester, U.K., Aug. 1988.

(Continued)

*Primary Examiner* — Kim Vu
*Assistant Examiner* — Michael Vanchy, Jr.
(74) *Attorney, Agent, or Firm* — Canon U.S.A., Inc. IP Division (57) ABSTRACT

An information processing apparatus includes an image acquisition unit, variation amount deriving unit, acquisition unit, and threshold value deriving unit. The image acquisition unit acquires a captured image obtained by an imaging unit. The variation amount deriving unit derives a luminance value variation amount of a predetermined area of the acquired captured image based on a luminance value of the predetermined area and first information indicating a relationship between a captured image luminance value and an amount of luminance value variation. The acquisition unit acquires an amount of variation of a luminance gradient value based on the derived amount of variation of the luminance value, wherein the luminance gradient value is a gradient value of the luminance value. The threshold value deriving unit derives a threshold value with which an obtained luminance gradient value is to be compared, based (Continued)

on the acquired amount of variation of the luminance gradient value.

18 Claims, 6 Drawing Sheets

(51) Int. Cl.
G06K 9/46 (2006.01)
G06T 5/00 (2006.01)
G06K 9/38 (2006.01)
G06T 7/73 (2017.01)
G06T 7/13 (2017.01)

(52) U.S. Cl.
CPC ......... *G06K 9/4604* (2013.01); *G06K 9/4609* (2013.01); *G06K 9/4671* (2013.01); *G06T 5/002* (2013.01); *G06T 7/13* (2017.01); *G06T 7/75* (2017.01); *G06T 2207/30164* (2013.01)

(58) Field of Classification Search
CPC ..... G06T 7/0046; G06T 7/0085; G01C 25/00; G06K 9/4604; G06K 9/4609; G06K 9/4671

See application file for complete search history.

(56) References Cited

U.S. PATENT DOCUMENTS

| | | | | |
|---|---|---|---|---|
| 2009/0034876 A1* | 2/2009 | Diggins | ............. | G06K 9/00711 382/286 |
| 2010/0225790 A1* | 9/2010 | Sasaki | ....................... | G06T 5/50 348/241 |
| 2010/0289797 A1* | 11/2010 | Tateno | .................. | G06T 7/0046 345/419 |
| 2012/0201448 A1* | 8/2012 | Nammoto | ............... | G06T 7/001 382/153 |

FOREIGN PATENT DOCUMENTS

| | | |
|---|---|---|
| JP | 4661934 A | 3/2011 |
| JP | 2012135345 A | 7/2012 |
| JP | 2013058036 A | 3/2013 |

OTHER PUBLICATIONS

D. Lowe, "Distinctive image features from scaleinvariant keypoints", Proc. of International Journal of Computer Vision (IJCV), 60(2), pp. 91-110, 2004.

T Drummond, R Cipolla, "Real-time visualtracking of complex structures," Pattern Analysis and Machine Intelligence, IEEE Transactions on 24 (7), 932-946, Jul. 2002.

R. Y. Tsai, "A versatile camera calibration technique for high-accuracy 3D machine vision metrology using off-the-shelf TV cameras and lenses," IEEE Journal of Robotics and Automation, vol. RA-3, No. 4,1987.

* cited by examiner

INFORMATION PROCESSING APPARATUS, INFORMATION PROCESSING METHOD, POSITION AND ORIENTATION ESTIMATION APPARATUS, AND ROBOT SYSTEM

BACKGROUND OF THE INVENTION

Field of the Invention

The present invention relates to a technique for determining a threshold value to be used in detection of local features of an image.

Description of the Related Art

The recent advances in robot technology have enabled robots to perform complicated tasks such as assembling processes of industrial products, which used to be manually performed by human workers. Such robots assemble components by gripping them using an end effector such as a hand. The assembly requires measurement of a relative position and orientation between a component to be gripped and the robot (hand). In the position and orientation measurement, a method using model fitting is used in which a three-dimensional geometric model of an object is fitted to features such as edges or key points detected from a two-dimensional image captured by a camera.

In a case of capturing an image of an object by a camera, noise (image sensor noise) such as optical shot noise and reading circuit noise is produced during a process of converting the amount of light entering an image sensor (e.g., complementary metal oxide semiconductor (CMOS) image sensor, charge-coupled device (CCD) image sensor, etc.) of the camera into electric charge. This causes luminance value variation due to the image sensor noise in the acquired image. Use of features detected, originating from such noise, in the model fitting processing impairs the accuracy of the measurement. Thus, it is necessary to set a predetermined threshold value (for example, a difference in luminance between neighboring pixels is equal to or greater than a predetermined level, etc.) in order to prevent detection of features originating from the noise in the feature detection.

In a conventional threshold value setting, manual tuning has commonly been used because an appropriate threshold value varies depending on the brightness of an image to be captured, the reflection luminance of an object, and an image sensor of a camera to be used to capture images. Meanwhile, Japanese Patent No. 4661934 discusses a feature detection method in which luminance variation originating from the image sensor noise is measured in advance and a threshold value is automatically set based on the measured variation. Specifically, Japanese Patent No. 4661934 discusses measuring in advance the amount of variation of luminance of light shielded pixels, automatically setting a threshold value based on the fixed amount of variation of luminance of the light shielded pixels and the image contrast, and then detecting features.

However, the manual tuning has an inevitable problem of inconsistency between human workers performing the manual tuning. Further, the manual tuning is not easy because practical experience is required to appropriately perform the tuning. Furthermore, the method discussed in Japanese Patent No. 4661934 estimates the noise level from the light shielded pixels. This means that only dark current noise among the image sensor noise is taken into consideration. Thus, the method has a problem that the shot noise produced proportionally to the brightness of a pixel cannot be taken into consideration in the process of setting a threshold value for edge detection.

SUMMARY OF THE INVENTION

According to an aspect of the present invention, an information processing apparatus includes an image acquisition unit configured to acquire a captured image obtained by an imaging unit that captures an image, a storage unit configured to store first information indicating a relationship between a luminance value of an image captured by the imaging unit and an amount of variation of the luminance value, a variation amount deriving unit configured to derive an amount of variation of a luminance value of a predetermined area of the acquired captured image based on a luminance value of the predetermined area of the acquired captured image and the first information, an acquisition unit configured to acquire an amount of variation of a luminance gradient value based on the derived amount of variation of the luminance value, wherein the luminance gradient value is a gradient value of the luminance value, and a threshold value deriving unit configured to derive a threshold value with which a luminance gradient value obtained from the acquired captured image is to be compared, based on the acquired amount of variation of the luminance gradient value.

According to an exemplary embodiment of the present invention, a threshold value for detecting features contained in an image can be suitably set.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

A first exemplary embodiment of the present invention will describe a case where an information processing apparatus and an information processing method are applied to a method for detecting edges from an image. As used herein, the edge detection refers to a process of identifying a point at which brightness discontinuously changes in an image, in order to detect a point at which the shape or material of an object image, illumination, or the like in the image discontinuously changes. In the present exemplary embodiment, a point with an extremal luminance gradient in an image is defined as an edge.

In the edge detection process, first, an image is convolved with a primary differential filter to calculate a luminance gradient between neighboring pixels. Then, for each of the pixels with an extremal luminance gradient, determination of whether the luminance gradient value is equal to or greater than a predetermined threshold value is performed to detect an edge. As described above, since the image contains noise originating from characteristics of an image sensor, it is necessary to appropriately set the threshold value of the luminance gradient value in order to prevent detection of an edge originating from the image sensor noise.

More specifically, it is necessary to set the threshold value in such a way that among the extrema of the luminance gradient value, an extremum that originates from the image sensor noise is eliminated while an extremum of the luminance gradient value of a portion where an edge is actually observed as a boundary of an object image in the image is not eliminated. However, since the luminance variation that originates from the image sensor noise has the characteristic that it changes proportionally to the amount of light, the threshold value that is appropriate for bright images is different from the threshold value that is appropriate for dark images. Furthermore, since the luminance gradient value is calculated differently depending on the coefficients of a filter for obtaining a luminance gradient, the threshold value that is appropriate also differs depending on an edge detection method such as the type of the primary differential filter.

In view of the foregoing, in the present exemplary embodiment, a relationship between the amount of light entering the image sensor and the amount of variation of luminance is measured in advance and parameterized by function fitting, whereby a model of the image sensor noise corresponding to the amount of light is created. Then, based on the image sensor noise model and the coefficients of the primary differential filter (image filter), a predicted value of the amount of variation of the luminance gradient value that originates from the image sensor noise is calculated. Thereafter, a threshold value to eliminate the extrema of the luminance gradient value originating from the image sensor noise is set based on the predicted value of the amount of variation of the luminance gradient value, whereby detection of an edge originating from the image sensor noise is prevented in the edge detection.

Figure 6:
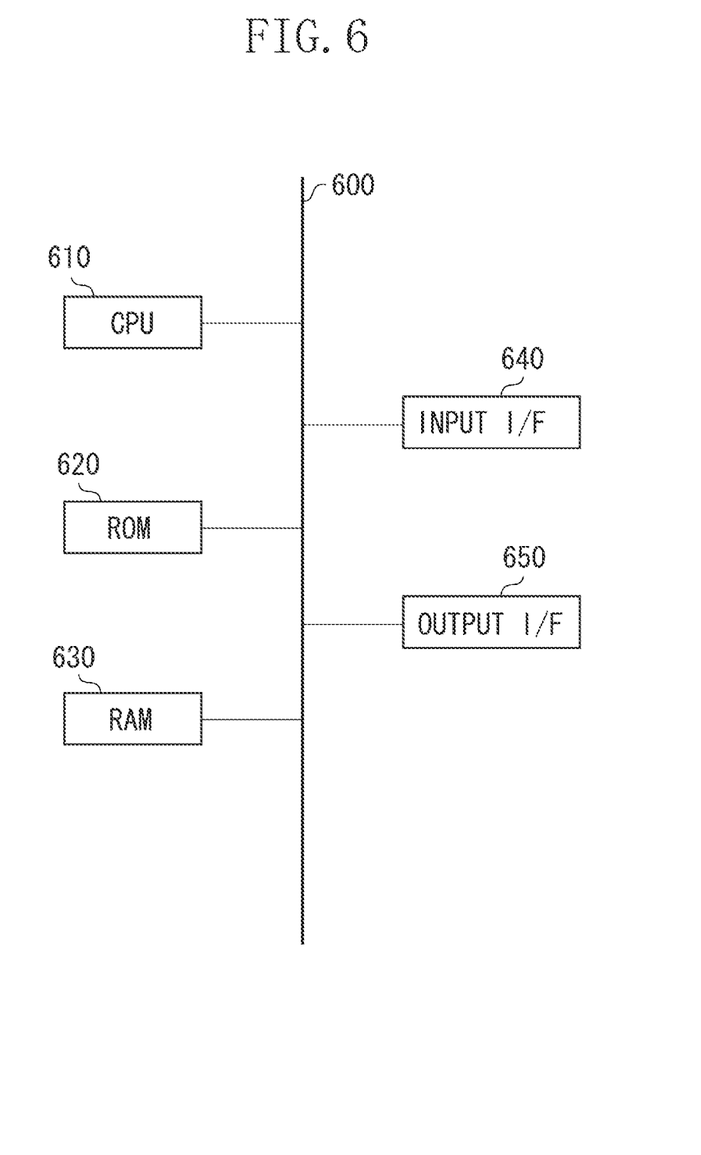
FIG. 6 is a hardware configuration diagram according to an exemplary embodiment of the present invention.

FIG. 6 is a hardware configuration diagram illustrating an information processing apparatus 1 according to the present exemplary embodiment. In FIG. 6, a central processing unit (CPU) 610 comprehensively controls each device connected via a bus 600. The CPU 610 reads and executes processing steps or programs stored in a read-only memory (ROM) 620. An operating system (OS), each processing program according to the present exemplary embodiment, device drivers, and the like are stored in the ROM 620, temporarily stored in a random-access memory (RAM) 630, and executed by the CPU 610 as necessary. Further, an input interface (I/F) 640 inputs images from an external apparatus (an imaging apparatus, etc.) as input signals in the form that is processable by the information processing apparatus 1. Further, an output I/F 650 outputs detected features and the like as output signals to an external apparatus such as a position and orientation estimation apparatus 2 in the form that is processable by the external apparatus.

Figure 1:
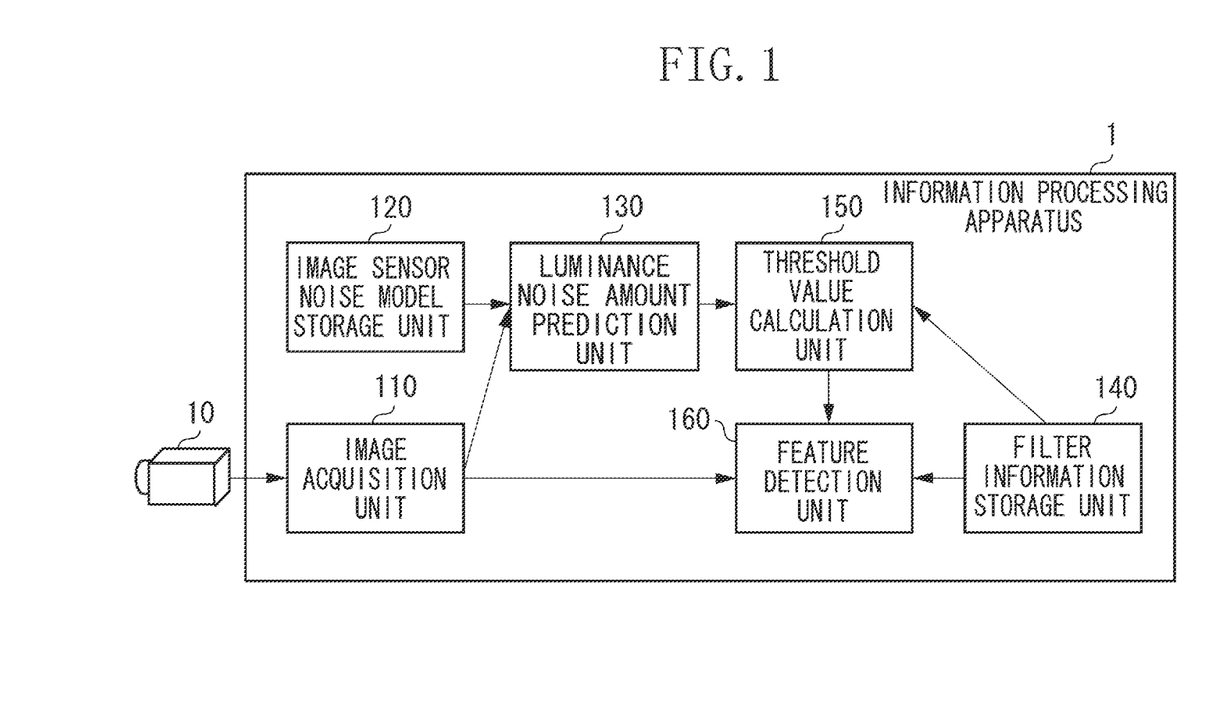
FIG. 1 illustrates a configuration of an information processing apparatus according to a first exemplary embodiment of the present invention.

The following describes details of feature detection processing according to the present exemplary embodiment. FIG. 1 illustrates the configuration of the information processing apparatus 1 according to the present exemplary embodiment. As illustrated in FIG. 1, the information processing apparatus 1 includes an image acquisition unit 110, an image sensor noise model storage unit 120, a luminance noise amount prediction unit 130, a filter information storage unit 140, a threshold value calculation unit 150, and a feature detection unit 160.

The CPU 610 loads a program stored in the ROM 620 into the RAM 630 to execute processing according to each flowchart described below, thereby realizing each of the foregoing function units. Further, for example, in a case where hardware is configured in place of the software processing using the CPU 610, operation units and/or circuits corresponding to the processes performed by the respective function units described herein may be configured.

Further, the information processing apparatus 1 is connected to an external imaging apparatus 10. The imaging apparatus 10 is a camera configured to capture normal images. Images to be captured may be grayscale images, color images, or range images with each pixel having depth information. A range measurement method for measuring a range image is not particularly limited. For example, an active stereo method including capturing an image of a multi-slit line irradiating a target by a camera to measure a range by triangulation may be used. Alternatively, a time-of-flight method using the time of flight of light may also be used. Further, a passive method including calculating the depth of each pixel by triangulation from an image captured by a stereo camera may also be used. In the present exemplary embodiment, the imaging apparatus 10 is a camera configured to capture and output grayscale images with each pixel storing a luminance value.

The following describes each component of the information processing apparatus 1.

The image acquisition unit 110 acquires an image captured by the imaging apparatus 10. As described above, the imaging apparatus 10 according to the present exemplary embodiment is a camera configured to capture grayscale images, and the image acquisition unit 110 acquires the grayscale images via an interface.

The image sensor noise model storage unit 120 stores an image sensor noise model that is based on the characteristics of the image sensor of the imaging apparatus 10. As used herein, the image sensor noise model indicates the relationship between the amount of light entering the image sensor and the amount of variation of luminance and is used to predict the amount of variation of the luminance value (temporal luminance variation range) based on the luminance value. In the present exemplary embodiment, the image sensor noise model is expressed as a function of the luminance value and the amount of variation of the luminance value. In the present exemplary embodiment, the image sensor noise includes two types of noise, optical shot noise and reading circuit noise. The optical shot noise is produced proportionally to the amount of light entering the image sensor. The reading circuit noise is produced in a predetermined amount during a process of reading electric charge from the image sensor. The image sensor noise model is created in advance by the following procedure. The image sensor noise model storage unit 120 stores the created image sensor noise model.

First, while the image sensor is shielded from light, the standard deviation (amount of variation of luminance) of output values (luminance values) of the entire image sensor is measured. The standard deviation of the luminance corresponds to a measured value representing the reading circuit noise that is not proportional to the amount of light. Next, while the image sensor is directly illuminated by light using a light source that can adjust the amount of light, the standard deviation and the mean of the luminance of the entire image sensor are measured. The standard deviation and the mean are measured while the amount of light is changed at a constant rate, whereby the standard deviation and the mean of the luminance values with different amounts of light can be obtained. This data corresponds to a measured value representing the optical shot noise that is proportional to the amount of light. The measured value representing the optical shot noise bears a proportional relationship to the luminance value in a semi-log space where the luminance value is on a logarithmic scale. Thus, by line fitting of the logarithmic luminance value and the measured data of the standard deviation of the luminance value, the relationship between the luminance value and the standard deviation of the luminance value can be represented by a function of two parameters, a proportionality coefficient $S_1$ and an offset coefficient $S_2$. Then, a measured value D of the reading circuit noise is added as the offset coefficient to express the image sensor noise model as a function of a total of three parameters. The amount $\sigma_{img}$ of variation of the luminance value can be predicted using the image sensor noise model from the following formula:

$$\sigma_{img} = \exp(\log(I)*S_1 + S_2) + D \qquad (1)$$

where I represents the luminance.

While the foregoing describes the image sensor noise model expressed as a function of the luminance value and the amount of variation of the luminance value, the image sensor noise model is not limited to the foregoing image sensor noise model. For example, the image sensor noise model may be created by storing changes in the amount of variation of the luminance value with changes in the luminance value in the form of a measured or calculated data reference table and then predicting the amount of variation of the luminance with respect to an input luminance value by referring to the stored reference table. Further, the image sensor noise may be measured using a standardized method according to ISO 12231 or 15739. As long as the amount of variation of the luminance value can be predicted based on the luminance value, the type of noise to be considered and the method for creating the model are not particularly limited, and any method may be used to create the image sensor noise model. The image sensor noise model is stored in the image sensor noise model storage unit 120 and input to the luminance noise amount prediction unit 130.

The luminance noise amount prediction unit 130 acquires the image sensor noise model from the image sensor noise model storage unit 120. Further, the luminance noise amount prediction unit 130 also acquires a captured image from the image acquisition unit 110. Then, based on the acquired image sensor noise model and the luminance of the captured image, the luminance noise amount prediction unit 130 predicts the amount of variation of the luminance that is based on the magnitude of the luminance. Details of a process of predicting the luminance noise amount will be described below.

The filter information storage unit 140 stores filter information for detecting a feature from the acquired image. In the present exemplary embodiment, the filter information storage unit 140 stores a 3×3 Sobel filter, which is a primary differential filter. A method of calculating a filter response value for detecting an edge feature is not limited to the Sobel filter, and the filter information storage unit 140 may store another primary differential filter such as a Prewitt filter or a Scharr filter. Further, the filter is not limited to the primary differential filter and may be a secondary differential filter such as a Laplacian filter. Further, as in a Canny edge detection algorithm, a smoothing filter such as a Gaussian filter may be applied first to eliminate image noise, and then the processing with the Sobel filter may be performed. As long as the amount of change in luminance between neighboring pixels can eventually be calculated, the type, number, and order of image filter processing are not particularly limited, and use of any method does not go beyond the nature of the present invention.

The threshold value calculation unit 150 calculates a threshold value for preventing detection of features originating from the image sensor noise, based on the luminance noise amount calculated by the luminance noise amount prediction unit 130 and the coefficients of the feature detection filter stored in the filter information storage unit 140. Details of the threshold value calculation processing will be described below.

The feature detection unit 160 detects an edge feature based on the threshold value calculated by the threshold value calculation unit 150. More specifically, in the present exemplary embodiment, the feature detection unit 160 calculates a luminance gradient value obtained by applying the filter acquired from the filter information storage unit 140 to the pixels of the image acquired from the image acquisition unit 110. Then, the feature detection unit 160 detects an edge feature by determining as an edge a pixel having a luminance gradient value greater than a threshold value, among the pixels having an extremal luminance gradient value among the neighboring pixels. The edge determination is not limited to the foregoing determination. For example, every pixel having a luminance gradient value greater than a threshold value may be determined as an edge without performing the extremum determination, or a pixel having a luminance gradient value that is within a predetermined range of or smaller than a threshold value may be determined as an edge. Further, in a case where the processing using a secondary differential filter such as a Laplacian filter is performed to calculate the secondary differential amount, a pixel with a secondary differential amount of zero may be determined as an edge. In this case, the luminance gradient value of the position at which the secondary differential value is zero or a secondary differential value close to zero may be used in the threshold value determination. As long as a pixel with a significant change in luminance gradient can be determined based on the threshold value calculated by the threshold value calculation unit 150, the edge detection process is not particularly limited, and any method may be used. Details of the feature detection processing will be described below.

The foregoing describes an example of the configuration of the information processing apparatus 1.

Figure 2:
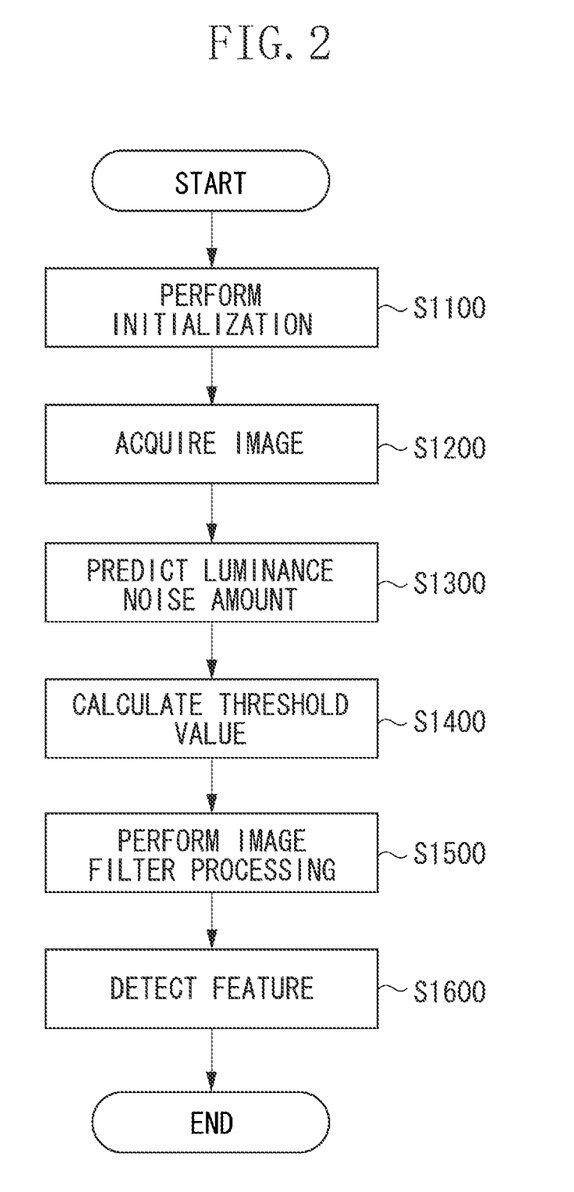
FIG. 2 is a flowchart illustrating a processing procedure to be performed by the information processing apparatus according to the first exemplary embodiment of the present invention.

The following describes the processing procedure of the feature detection according to the present exemplary embodiment. FIG. 2 is a flowchart illustrating the processing procedure of the feature detection according to the present exemplary embodiment.

(Step S1100)

First, in step S1100, the luminance noise amount prediction unit 130 acquires the image sensor noise model stored in the image sensor noise model storage unit 120. The image sensor noise model is a noise model of the image sensor of the imaging apparatus 10 that was measured in advance according to the procedure described above. While the noise model is assumed to be stored in the ROM 620, a hard disk (not illustrated), or the like in the present exemplary embodiment, the noise model may be stored in an external storage device and acquired by reading. The image sensor noise model used in the present exemplary embodiment is a noise model including a total of three parameters, parameters S1 and S2, which relate to the optical shot noise, and a parameter D, which relates to the reading circuit noise. When the initialization of the information processing apparatus 1 is completed, step S1100 is ended, and the processing proceeds to step S1200.

(Step S1200)

Next, in step S1200, the image acquisition unit 110 acquires a grayscale image from the imaging apparatus 10. Alternatively, captured images may be stored in advance in a storage medium, and the image acquisition unit 110 may acquire a grayscale image by reading the storage medium instead of acquiring a grayscale image directly from the imaging apparatus 10. When the acquisition of the grayscale image is completed, the image acquisition unit 110 sends the acquired grayscale image to the luminance noise amount prediction unit 130 and the filter information storage unit 140. Then, step S1200 is ended, and the processing proceeds to step S1300.

(Step S1300)

Next, in step S1300, the luminance noise amount prediction unit 130 predicts the luminance noise amount of a predetermined area of the grayscale image based on the image sensor noise model acquired in step S1100 and the grayscale image acquired in step S1200. In the present exemplary embodiment, the luminance noise amount is calculated for each pixel of the image based on the image sensor noise model.

As described above, the predicted value $\sigma_{img}$ of the luminance noise amount can be calculated by the formula (1), where I is the luminance value of a target pixel, based on the proportionality coefficient $S_1$ and the offset coefficient $S_2$, which represent the optical shot noise, and the offset coefficient D, which represents the reading circuit noise. The luminance noise amount prediction processing using the formula (1) is performed on every pixel of the image to calculate the predicted value of the luminance noise amount of every pixel. While the predicted value of the luminance noise amount is calculated for each pixel in the present exemplary embodiment, the luminance noise amount prediction processing is not limited to the foregoing processing. For example, instead of calculating the predicted value for each pixel, the predicted value may be calculated for each predetermined area. In this case, for example, the predetermined areas may be set based on the neighborhood of the target pixel such as a 3×3 range in the neighborhood of the target pixel or a predetermined circle diameter range from the target area, or the image may be segmented into grids to set the predetermined areas. Further, for example, statistical values such as the maximum and minimum values, mean, mode, and median relating to the luminance of the predetermined areas may be used as a representative value of the luminance of the predetermined areas for predicting the luminance noise amount. As long as the predicted value of the luminance noise amount in the image can be calculated, the luminance noise amount calculation method and range are not particularly limited, and any method may be used.

When the foregoing processing to calculate the predicted value of the luminance noise amount of each pixel of the image is completed, the calculated predicted values are sent to the threshold value calculation unit 150. Then, step S1300 is ended, and the processing proceeds to step S1400.

(Step S1400)

Next, in step S1400, the threshold value calculation unit 150 calculates (derives) a threshold value for the feature detection based on the predicted value of the luminance noise amount of each pixel calculated in step S1300 and the filter information stored in the filter information storage unit 140.

The following describes in detail a method for calculating the predicted value of the amount of variation (deriving the amount of variation) of the luminance gradient value based on the predicted value of the luminance noise amount and the coefficients of the feature detection filter.

First, the coefficients of the feature detection filter are acquired as filter information from the filter information storage unit 140 (see the following formulas (2) and (3)). Then, a relation formula (Jacobian of luminance gradient value) representing the rate by which the luminance gradient value changes when the luminance is infinitesimally changed is calculated from the acquired coefficients of the feature detection filter (see the following formula (6)).

The Sobel filter used in the present exemplary embodiment is defined for each direction of an image. Thus, the filter processing of two filters, the Sobel filter along the horizontal direction of the image and the Sobel filter along the vertical direction of the image, is performed, and the length of a response value vector is calculated as the luminance gradient value. More specifically, the response value $g_x$ of the Sobel filter along the horizontal direction of the image, the response value $g_y$ of the Sobel filter along the vertical direction of the image, and the luminance gradient value G are defined by the following formulas:

$$g_x = -I_{11} - 2*I_{21} - I_{31} + I_{13} + 2*I_{23} + I_{33} \quad (2)$$

$$g_y = -I_{11} - 2*I_{12} - I_{13} + I_{31} + 2*I_{32} + I_{33} \quad (3)$$

$$G = \sqrt{g_x^2 + g_y^2} \quad (4)$$

$$J_G = \frac{\partial G}{\partial I} = \left[\frac{\partial G}{\partial I_{11}} \cdots \frac{\partial G}{\partial I_{33}}\right] \quad (5)$$

where $I_{22}$ is the luminance value of the target pixel, and $I_{11}$ to $I_{33}$ are the luminance values of the upper left to the lower right of the target pixel.

In the present exemplary embodiment, the 3×3 Sobel filter is used as the filter. Thus, predicted values $\sigma_{11}$ to $\sigma_{33}$ of the luminance noise amount corresponding respectively to the pixels $I_{11}$ to $I_{33}$ to which the Sobel filter is to be applied are acquired from the luminance noise amount prediction unit 130. Then, the luminance gradient value G is calculated based on the formulas (2) to (4), and a matrix $J_G$ (Jacobian of luminance gradient value) is calculated by partially differentiating the luminance gradient value G with respect to each of the pixels $I_{11}$ to $I_{33}$ (see the formula (5)).

The predicted value $\sigma_G$ of the amount of variation of the luminance gradient value can be calculated by the following formula (6) based on the Jacobian of the luminance gradient value and the predicted value of the luminance noise amount of each pixel. Then, based on the calculated predicted value of the amount of variation of the luminance gradient value, the threshold value for the feature detection processing is calculated.

$$\sigma_G = \sqrt{J_G \Sigma_{img} J_G^T} \quad (6)$$

$$\Sigma_{img} = \begin{bmatrix} \sigma_{11}^2 & & 0 \\ & \ddots & \\ 0 & & \sigma_{33}^2 \end{bmatrix} \quad (7)$$

By the foregoing processing, the amount $\sigma_G$ of variation of the luminance gradient value is calculated for every pixel.

While the foregoing describes the method of calculating the amount $\sigma_G$ of variation of the luminance gradient value based on the Jacobian of the gradient value calculation formula in the image filter processing, the method is not limited to the foregoing method. For example, the relationship between the amount of variation of the luminance value and the amount of variation of the luminance gradient value may be measured multiple times and stored as a reference table to calculate the amount of variation of the luminance gradient value with respect to the amount of variation of the luminance value. Further, parameters obtained by function fitting of the above-mentioned measured values may be used to calculate the amount of variation of the luminance gradient value with respect to the amount of variation of the luminance value. The calculation method is not particularly limited, and any method by which the amount of variation of the luminance gradient value can be calculated based on the amount of variation of the luminance value may be used.

The amount $\sigma_G$ of variation of the luminance gradient value calculated above represents the magnitude of the luminance gradient value originating from the luminance noise. Thus, to prevent detection of features originating from the luminance noise, the threshold value may be set to be at least equal to or greater than $\sigma_G$. In the present exemplary embodiment, $3\sigma_G$ is set as the threshold value. The threshold value setting method is not limited to the foregoing method. For example, an arbitrary constant multiple of $\sigma_G$, or the sum of $\sigma_G$ and a predetermined offset value may be set as the threshold value. The threshold value setting method is not particularly limited, and any method by which the threshold value is set based on the predicted value of the amount of variation of the luminance gradient value that is based on the predicted value of the luminance noise amount may be used.

When the calculation of the threshold value for each pixel in the image by the foregoing processing is completed, step S1400 is ended, and the processing proceeds to step S1500.
(Step S1500)

Next, in step S1500, the feature detection unit 160 acquires from the filter information storage unit 140 the image filter for detecting features, and applies the acquired image filter to the grayscale image acquired in step S1200. In the present exemplary embodiment, as described above, the 3×3 Sobel filter is acquired from the filter information storage unit 140, and the luminance gradient value of the image is calculated using the acquired Sobel filter. More specifically, the luminance gradient value of the image is calculated using the above formulas (2) to (4).

The foregoing processing is performed on every pixel to calculate the luminance gradient value G for each pixel. When the image filter processing is completed, step S1500 is ended, and the processing proceeds to step S1600.
(Step S1600)

Next, in step S1600, the feature detection unit 160 detects an edge feature by determining an edge pixel based on the luminance gradient value calculated in step S1500 and the threshold value calculated in step S1400. In the present exemplary embodiment, as described above, among the pixels having an extremal luminance gradient value among the neighboring pixels, the pixel having a luminance gradient value greater than the threshold value calculated in step S1500 is determined as an edge. The following describes in detail the method for calculating the extrema of the luminance gradient value among the neighboring pixels and the threshold value determination processing.

First, a gradient direction A is calculated for each pixel by the following formula (8) from the response values ($g_x$, $g_y$) of the Sobel filters of the respective directions that are defined in step S1400.

$$A = \arctan(g_x/g_y) \quad (8)$$

Based on the gradient direction A, the luminance gradient value of an adjacent pixel in the gradient direction is referred to, and a pixel having an extremal luminance gradient value is determined. Then, the absolute value of the extremal luminance gradient value is compared with the threshold value calculated in step S1500. If the absolute value is greater than the threshold value, the pixel is determined as an edge.

The foregoing processing is performed on every pixel, and when the edge determination processing on every pixel is completed, the processing is ended, and the result of the edge detection from the image is determined.

The foregoing present exemplary embodiment describes the method by which the threshold value for preventing, in edge detection from an image, detection of an edge originating from the image sensor noise is calculated based on the predicted value of the luminance noise amount based on the image sensor noise model and the coefficients of the filter for gradient detection.

By this method, threshold values for preventing detection of a feature originating from the image sensor noise can automatically be set for images with different brightness levels, so as to conduct feature detection. The amount of variation of the filter response value used in the feature detection that originates from the image sensor noise is predicted so that an appropriate threshold value for an arbitrary feature detection method can automatically be calculated.

Modification Example 1

While the foregoing exemplary embodiment describes the edge detection method as a feature detection method, the feature detection method is not limited to the foregoing edge detection method. For example, the feature detection may be detection of point features such as Harris feature points discussed in the following document.

C. Harris and M. Stephens, "A combined corner and edge detector," Proc. 4th Alvey Vision Conf., pp. 147-151, Manchester, U.K., August 1988.

In this case, the filter processing, the threshold value calculation processing, and the feature detection processing are different from the exemplary embodiment described above. First, in the filter processing, a Gaussian filter and a primary differential filter are applied to an entire image, and differential images of vertical and horizontal directions of the smoothed image are calculated. Then, based on the differential images of the vertical and horizontal directions, a Hesse matrix representing a secondary differential value of a neighborhood of the target point is calculated, and a Harris corner measure is calculated based on the determinant and trace of the Hesse matrix.

The foregoing processing is performed on every pixel in the image. Then, the threshold value calculation processing is performed as in step S1400 according to the first exemplary embodiment. More specifically, the predicted value σc of the amount of variation of the corner measure is calculated from a matrix (Jacobian of corner measure) obtained by partially differentiating the formula by which the Harris corner measure is calculated, with respect to each pixel for which the corner measure is calculated, and from the predicted value of the luminance noise amount corresponding to the pixel. Then, 3σc is set as a threshold value of the corner measure.

Then, in the feature detection processing, the corner measure calculated in the filter processing is compared with the threshold value calculated in the threshold value calculation processing, and a pixel having a corner measure greater than the threshold value is output as a feature point. The calculation of the predicted value of the luminance noise amount originating from the image sensor noise is similar to that in the exemplary embodiment described above.

While the present modification example describes the Harris feature points as an example, the feature point detection method is not limited to the method for detecting the Harris feature points, and may be a method for detecting another feature points such as Moravec features, Shi-Tomashi features, or features from accelerated segment test (FAST). Further, for example, the exemplary embodiment of the present invention may be applied to blob feature detection such as the difference of Gaussian (DoG) processing in scale-invariant feature transform (SIFT) as discussed in the following document.

D. Lowe, "Distinctive image features from scale in variant key points", Proc. of International Journal of Computer Vision (IJCV), 60(2), pp. 91-110, 2004.

By the foregoing processing, threshold values for preventing feature detection originating from the image sensor noise can automatically be set for images with different brightness levels, so that detection of point features or blob features can be performed.

Modification Example 2

The foregoing exemplary embodiment describes the method in which the feature detection is performed on the entire image. Alternatively, a method of locally detecting an edge in the neighborhood of a target area without detecting features from the entire image as discussed in the following document may be used.

T Drummond, R Cipolla, "Real-time visual tracking of complex structures," Pattern Analysis and Machine Intelligence, IEEE Transactions on 24 (7), 932-946.

In this case, the image filter processing, the luminance noise amount prediction processing, the threshold value calculation processing, and the feature detection processing according to the exemplary embodiment described above are performed not on every pixel in the image but only on a predetermined target area or pixel. By this method, the cost of processing the entire image can be reduced, and the feature detection can be performed only on the target area at high speed.

The following second exemplary embodiment is another suitable application of the feature detection performed by an information processing apparatus 1 according to an exemplary embodiment of the present invention. More specifically, in an application example, the position and orientation of an object to be measured (target object) is estimated by fitting a feature of a three-dimensional geometric model representing the shape of the object to a feature detected by the information processing apparatus 1. The following describes a case where an information processing apparatus 1 according to the second exemplary embodiment is applied to the feature detection in the position and orientation estimation based on features in the image, with reference to FIG. 3. The present exemplary embodiment will describe only different points from the first exemplary embodiment, and a description of configurations similar to those of the first exemplary embodiment is omitted. Further, while the present exemplary embodiment describes the information processing apparatus 1 and a position and orientation estimation apparatus 2 as separate apparatuses, the information processing apparatus 1 and the position and orientation estimation apparatus 2 may be integrated as a single apparatus.

Figure 3:
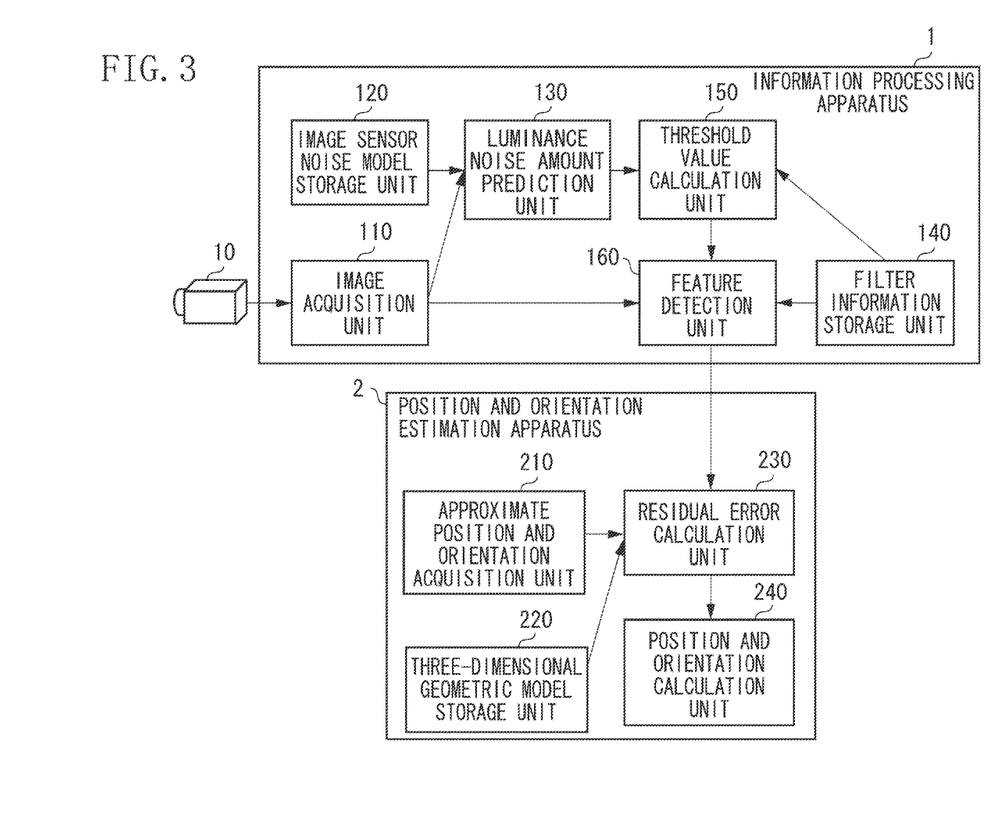
FIG. 3 illustrates a configuration of an information processing apparatus according to a second exemplary embodiment of the present invention.

FIG. 3 is a block diagram illustrating an example of schematic configurations of the information processing apparatus 1 and the position and orientation estimation apparatus 2 according to the second exemplary embodiment of the present invention. As illustrated in FIG. 3, the information processing apparatus 1 includes an image acquisition unit 110, an image sensor noise model storage unit 120, a luminance noise amount prediction unit 130, a filter information storage unit 140, a threshold value calculation unit 150, and a feature detection unit 160, as in the first exemplary embodiment. Further, the position and orientation estimation unit 2 includes an approximate position and orientation acquisition unit 210, a three-dimensional geometric model storage unit 220, a residual error calculation unit 230, and a position and orientation calculation unit 240. The configuration illustrated in FIG. 3 is an application example of the information processing apparatus according to an exemplary embodiment of the present invention.

The following describes each component of the information processing apparatus 1 and the position and orientation estimation unit 2. The image sensor noise model storage unit 120, the luminance noise amount prediction unit 130, the filter information storage unit 140, the threshold value calculation unit 150, and the feature detection unit 160 of the information processing apparatus 1 are similar to those of the information processing apparatus 1 according to the first exemplary embodiment. Internal parameters of the imaging apparatus 10 according to the present exemplary embodiment, such as a focal length, principal point position, and lens distortion parameters, are calibrated in advance by referring to the specifications of a device to be used or by a method disclosed in the following document.

R. Y. Tsai, "A versatile camera calibration technique for high-accuracy 3D machine vision metrology using off-the-shelf TV cameras and lenses," IEEE Journal of Robotics and Automation, vol. RA-3, no. 4, 1987.

The approximate position and orientation acquisition unit 210 acquires an approximate position and an approximate orientation of an object to be measured. The approximate values of the position and orientation of the object to be measured with respect to an imaging apparatus 10 are input. In the present exemplary embodiment, the position and orientation calculation apparatus 2 is configured to continuously perform the measurement, and uses previously-measured values (values measured at the previous time) as the approximate position and the approximate orientation. However, the method of inputting approximate values of the position and orientation is not limited to the foregoing method.

For example, the velocity and angular velocity of an object may be estimated using a time-series filter based on the position and orientation measured in the past, and then the current position and orientation may be predicted based on the past position and orientation and the estimated velocity and acceleration. Further, images of a target object captured in various orientations may be stored as templates, and the approximate position and orientation of the target object may be estimated by performing template matching on an input image.

Further, in a case where the position and orientation of an object can be measured by another sensor, output values of the sensor may be used as approximate values of the position and orientation. The sensor may be, for example, a magnetic sensor configured to measure the position and orientation of an object by detecting, with a receiver attached to the object, a magnetic field produced by a transmitter. Further, the sensor may be an optical sensor configured to measure the position and orientation of an object by capturing an image of a marker arranged on the object with a camera fixed to the scene. Further, the sensor may be any six-degree-of-freedom sensor configured to measure the position and orientation of an object. Further, in a case where the approximate position and orientation of an object are already known, the values are used as the approximate values.

The three-dimensional geometric model storage unit 220 stores a three-dimensional geometric model representing the shape of an object to be measured. In the present exemplary embodiment, the three-dimensional geometric model includes three-dimensional local line information (hereinafter, referred to as "local line feature") on an object outline including the three-dimensional position and the three-dimensional line direction. The shape information to be stored as the three-dimensional geometric model is not particularly limited in terms of the form of representation and may be any three-dimensional geometric information representing the shape of a target object. For example, any form of representation may be used, such as shape information in the form of three-dimensional lines representing ridgelines of the target object, or in the form of a polygon represented by a set of planes formed by three three-dimensional points and lines. The three-dimensional geometric model stored in the three-dimensional geometric model storage unit 220 is input to the residual error calculation unit 230.

The residual error calculation unit 230 calculates residual errors (distances between image edges and local line features on the image) between edge features detected by the feature detection unit 160 of the information processing apparatus 1, and features in the three-dimensional geometric model. Details of the processing will be described below.

The position and orientation calculation unit 240 measures a position and orientation between the imaging apparatus 10 and the object to be measured based on the residual error information calculated by the residual error calculation unit 230 in such a way that the residual errors are minimized. Details of the processing will be described below.

Figure 4:
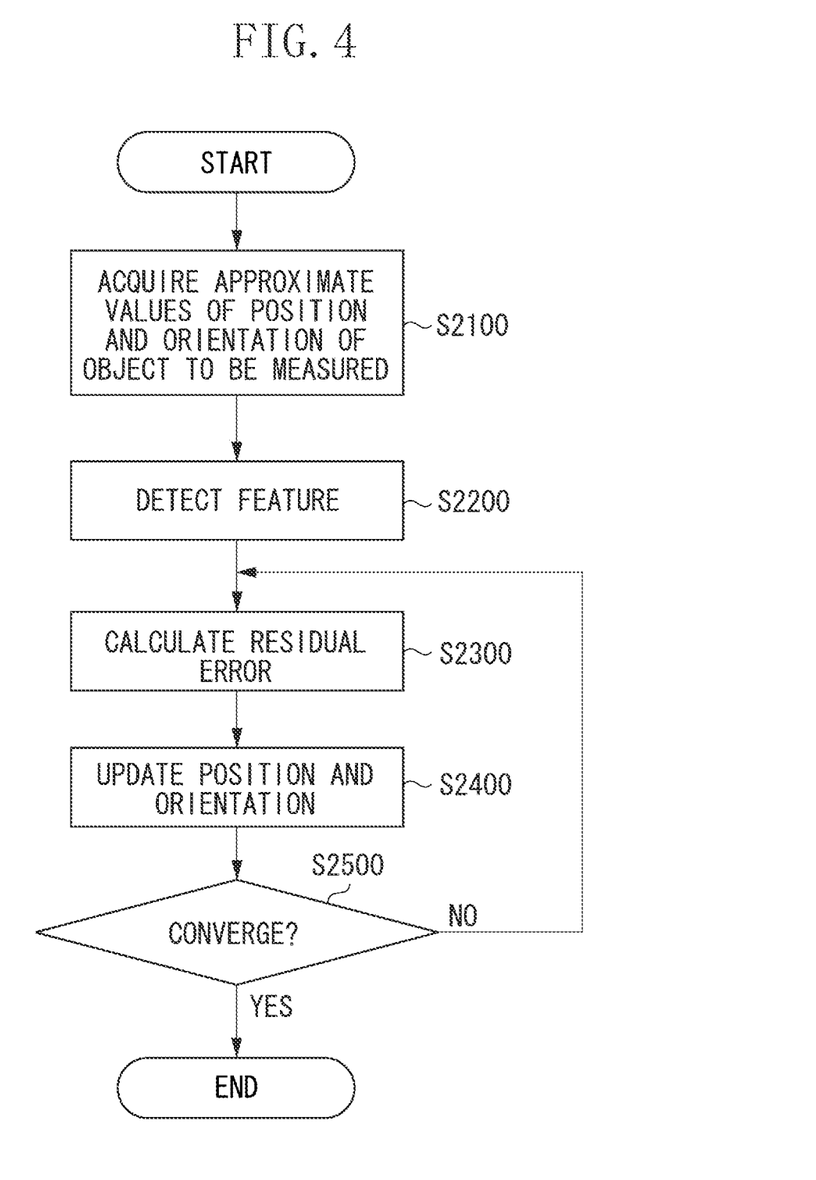
FIG. 4 is a flowchart illustrating a processing procedure to be performed by the information processing apparatus according to the second exemplary embodiment of the present invention.

The following describes a processing procedure of the position and orientation estimation method according to the present exemplary embodiment. FIG. 4 is a flowchart illustrating an example of the processing procedure of the position and orientation estimation method performed by the information processing apparatus 1 and the position and orientation estimation unit 2 according to the second exemplary embodiment of the present invention.

(Step S2100)

In step S2100, the approximate position and orientation acquisition unit 210 acquires approximate values of the position and orientation of an object to be measured with respect to the imaging apparatus 10. In the present exemplary embodiment, the approximate position and orientation of the object are assumed to be already known, and the values thereof are used as the approximate values. When step S2100 is completed and ended, the processing proceeds to step S2200.

(Step S2200)

Next, in step S2200, the information processing apparatus 1 detects edge features of the object to be measured. The processing in step S2200 is similar to that in steps S1100 to S1600 according to the first exemplary embodiment, so a detailed description of step S2200 is omitted. When the processing to detect edge features from the image in step S2200 is completed, step S2200 is ended and the processing proceeds to step S2300.

(Step S2300)

Next, in step S2300, the residual error calculation unit 230 calculates residual errors between the edge features (image features) detected in step S2200 and features extracted from the three-dimensional geometric model. More specifically, the residual error calculation unit 230 acquires the detected features from the information processing apparatus 1. Further, the residual error calculation unit 230 acquires the approximate position and orientation from the approximate position and orientation acquisition unit 210 and the three-dimensional geometric model from the three-dimensional geometric model storage unit 220. Then, the residual error calculation unit 230 calculates positions of local line features constituting the three-dimensional geometric model that are projected onto the image by using the acquired approximate position and orientation and the calibrated internal parameters of the imaging apparatus 10. Then, the residual error calculation unit 230 associates the edges detected on the image with the local line features in the three-dimensional geometric model, and calculates distances between the image edges and the local line features on the image as residual errors. In a case where multiple edges corresponding to a single local line feature are detected, the closest edge to the projected local line feature on the image is associated with the local line feature among the detected multiple edges. When the calculation of the residual error for every local line feature is completed, step S2300 is ended and the processing proceeds to step S2300.

(Step S2400)

Next, in step S2400, the position and orientation calculation unit 240 calculates a position and orientation between the three-dimensional geometric model and the object to be measured, based on the residual errors between the local line features and the image edges calculated in step S2300. In step S2400, the position and orientation calculation unit 240 solves linear simultaneous equations so as to minimize the residual errors between the local line features and the image edges, thereby updating the position and orientation. This processing is not an essential part of the present exemplary embodiment, so a description of the processing is omitted. Details are described in the following document.

T Drummond, R Cipolla, "Real-time visual tracking of complex structures," Pattern Analysis and Machine Intelligence, IEEE Transactions on 24 (7), 932-946.

When the position and orientation updating processing is completed, step S2400 is ended and the processing proceeds to step S2500.

(Step S2500).

Next, in step S2500, the position and orientation calculation unit 240 determines whether the position and orientation updated in step S2400 have converged. That is to say, the position and orientation calculation unit 240 determines whether the calculation needs to be repeated. More specifically, in a case where a correction value is approximately zero or a case where a difference between the sum of squares of error vectors to be corrected and the sum of squares of corrected error vectors is approximately zero, the position and orientation calculation unit 240 determines that the position and orientation updated in step S2400 have converged. If the position and orientation updated in step S2400 have not converged (NO in step S2500), the processing returns to step S2300, and the residual error calculation processing is performed again using the updated position and orientation. If the position and orientation calculation unit 240 determines that the position and orientation updated in step S2400 have converged (YES in step S2500), the processing ends.

By the foregoing processing, final estimated values of the relative position and orientation of the object with respect to the imaging apparatus 10 are determined.

The information processing apparatus 1 and the position and orientation estimation unit 2 according to the present exemplary embodiment estimate the position and orientation based on the features that are detected while preventing detection of features originating from the image sensor noise, whereby the position and orientation of the object to be measured with respect to the imaging apparatus 10 can be estimated with high accuracy.

Figure 5:
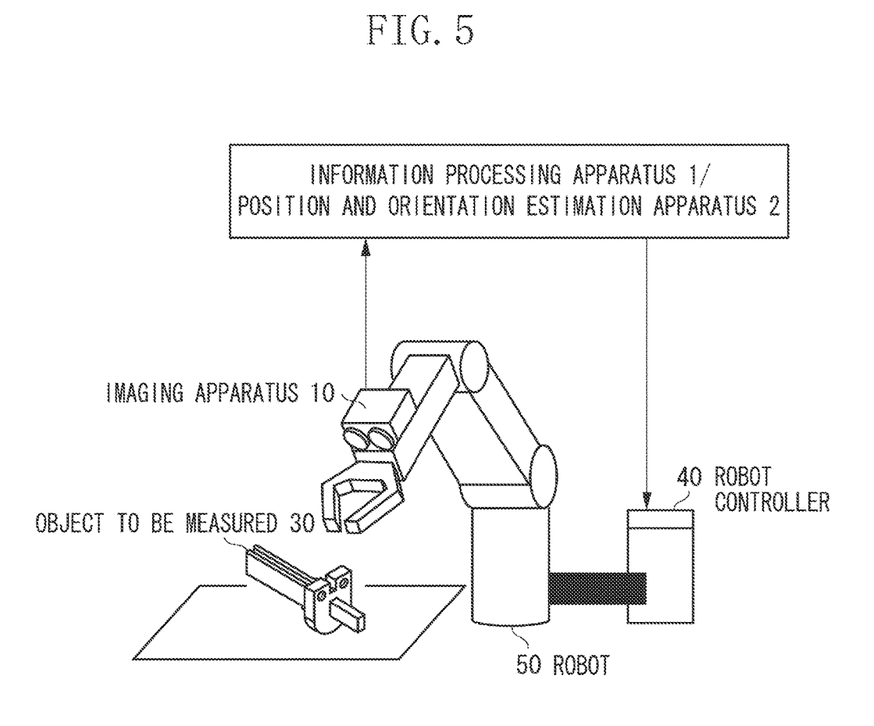
FIG. 5 illustrates a configuration of an information processing apparatus according to a third exemplary embodiment of the present invention.

The following third exemplary embodiment is another suitable application of an information processing apparatus 1 and a position and orientation estimation unit 2 according to an exemplary embodiment of the present invention. A specific application example is as follows. The position and orientation of an object 30 to be measured are estimated based on a grayscale image acquired from the imaging apparatus 10, and an arm of an industrial robot 50 is controlled based on the estimated position and orientation. Then, a robot hand at the end of the arm of the robot 50 grips the object 30 to be measured (holds the target object). The following describes an application example of the position and orientation estimation unit 2, which is an exemplary embodiment of the present invention, with reference to FIG. 5. FIG. 5 illustrates an example of the configuration of a robot system in which the object 30 to be measured is gripped by the position and orientation estimation unit 2 and the robot 50.

A robot controller 40 controls the robot 50 to move the hand to an ordered position and grip an object or the like. Since the position of the object 30 on a working table changes, the current position and orientation of the object 30 needs to be estimated to control the gripping action of the robot 50.

The imaging apparatus 10 is a camera configured to capture normal grayscale images. The imaging apparatus 10 is disposed at a position such as the hand at the end of the arm of the industrial robot 50 from which the imaging apparatus 10 can capture an image of the object 30 to be measured.

The position and orientation estimation unit 2 estimates the position and orientation of the object 30 based on a grayscale image acquired from the imaging apparatus 10. The position and orientation of the object 30 estimated by the position and orientation estimation unit 2 are input to the robot 50, and the arm of the robot 50 is controlled to grip the object 30, etc. With the information processing apparatus 1 according to the present exemplary embodiment, the robot system can grip (hold) the object 30 by estimating the position and orientation of the object 30 even if the position of the object 30 is not fixed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Benefits of Exemplary Embodiments

The first exemplary embodiment has described the method by which the threshold value for preventing, in edge detection from an image, detection of edges originating from the image sensor noise is calculated based on the predicted value of the luminance noise amount based on the image sensor noise model, and the coefficients of the filter for gradient detection. By this method, threshold values for preventing detection of features originating from the image sensor noise can be automatically set for images with different brightness levels to perform the feature detection. The amount of variation of the filter response value to be used in the feature detection that originates from the image sensor noise is predicted, whereby the threshold value that is appropriate for an arbitrary feature detection method can be automatically calculated.

The second exemplary embodiment has described the method by which the position and orientation of an object to be measured are estimated by performing model fitting in such a way that the three-dimensional geometric model representing the shape of the object to be measured is fitted to the features detected from a grayscale image. The position and orientation are estimated based on the features detected while preventing detection of features originating from the image sensor noise, whereby the position and orientation of the object to be measured can be estimated with high accuracy.

The third exemplary embodiment has described the method by which the information processing apparatus and the position and orientation estimation unit according to an exemplary embodiment of the present invention estimate the position and orientation of the object to be measured, and the robot system grips and moves the object to be measured based on the estimation result. By this method, even if the position of the object to be measured is not fixed, the robot system can grip the object to be measured.

Definition

As used herein, the image acquisition is not limited to the input by a camera configured to acquire grayscale images, and any other method by which a target image can be acquired may be used. For example, grayscale images or color images may be used. Further, the images are not limited to those captured by a camera, and images read from a file stored in a storage medium or an external network may be input. Further, range images with each pixel having depth information may be used.

As used herein, the image sensor noise model is not particularly limited, and any model with which the amount of variation of the luminance value can be predicted based on the luminance value may be used. For example, the image sensor noise model may be represented as a function of the luminance value and the amount of variation of the luminance value. Further, the image sensor noise model may be created by storing changes in the amount of variation of the luminance value with changes in the luminance value, in the form of a measured or calculated data reference table, and then predicting the amount of variation of the luminance with respect to an input luminance value by referring to the stored reference table. Further, the image sensor noise may be measured using a standardized method according to ISO 12231 or 15739.

As used herein, the luminance noise amount prediction is not particularly limited in terms of the calculation method, and any method by which the predicted value of the luminance noise amount can be calculated based on the image sensor noise model and the luminance in the image may be used. For example, the luminance noise amount of a target pixel may be predicted by calculating the predicted value only from the luminance value of the target pixel. Alternatively, statistical values of the luminance value of a neighborhood area of the target pixel may be calculated, and the luminance noise amount of the target pixel may be predicted from the calculated statistical values.

As used herein, the type, number, and order of image filter processing are not particularly limited, and use of any method by which the filter response value for performing the feature detection can be calculated does not go beyond the nature of the present invention. For example, in the case of edge detection, a Sobel filter, which is a primary differential filter, may be convolved with an image to calculate the luminance gradient value for each pixel, or other primary differential filter such as a Prewitt filter or a Scharr filter may be used. Further, a secondary differential filter such as a Laplacian filter may be used. Further, as in a Canny edge detection algorithm, a smoothing filter such as a Gaussian filter may be applied first to eliminate image noise, and then the processing with the Sobel filter may be performed.

As used herein, the threshold value calculation is not particularly limited in terms of the threshold value setting method, and any method by which the threshold value is set based on the predicted value of the amount of variation of the luminance gradient value may be used. For example, an arbitrary constant multiple of the predicted value of the amount of variation of the luminance gradient value may be set as the threshold value, or the sum of the predicted value of the amount of variation of the luminance gradient value and a predetermined offset value may be set as the threshold value. Further, the processing for predicting the amount of variation of the luminance gradient value that originates from the image sensor noise is not particularly limited in terms of the calculation method, and any method by which the amount of variation of the luminance gradient value can be calculated based on the amount of variation of the luminance value may be used. For example, the amount of variation of the luminance gradient value may be calculated based on the Jacobian of the gradient value calculation equation in the image filter processing. Further, the relationship between the amount of variation of the luminance value and the amount of variation of the luminance gradient value may be measured multiple times and stored as a reference table to calculate the amount of variation of the luminance gradient value with respect to the amount of variation of the luminance value. Further, parameters obtained by function fitting of the above-mentioned measured values may be used to calculate the amount of variation of the luminance gradient value with respect to the amount of variation of the luminance value.

As used herein, the feature detection is not particularly limited in terms of the feature detection method, and any feature detection method by which feature points can be detected based on the filter response values obtained as a result of the image filter processing and the threshold value may be used. For example, in the case of detecting edge features, a pixel having a luminance gradient value greater than the threshold value among the pixels having an extremal luminance gradient value among the neighboring pixels may be determined as an edge. Further, all pixels having a luminance gradient value greater than the threshold value may be determined as an edge without performing the extremum determination. Further, a pixel having a luminance gradient value that is within a predetermined range of or smaller than the threshold value may be determined as an edge. Further, in a case where a secondary differential amount is obtained as a result of the secondary differential filter processing such as using a Laplacian filter, a pixel with a secondary differential amount of zero may be determined as an edge. In this case, the luminance gradient value of the position at which the secondary differential value is zero, or a secondary differential value close to zero may be used in the threshold value determination. Further, feature points may be detected by calculating from the filter response value an index for evaluating the cornerness. Further, as in the DoG processing in the SIFT, blob feature detection may be performed based on a difference between response values of smoothing filters having different smoothing amounts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-058490 filed Mar. 20, 2014, which is hereby incorporated by reference herein in its entirety.

What is claimed is:
1. An information processing apparatus comprising:
a processor to communicate with a memory;
an image acquirer configured to acquire a captured image obtained by an image sensor that captures an image;
a storage configured to store relationship information indicating a relationship between a luminance value of an image captured by the image sensor and an amount of variation of the luminance value;
a variation amount deriving unit configured to derive an amount of variation of a luminance value of respective pixels in the acquired captured image based on luminance values in the acquired captured image and the relationship information;
a coefficient acquirer configured to acquire a filter coefficient of a feature detection filter used to detect an image feature from the captured image;
a calculation unit configured to calculate a luminance gradient value which is a gradient value of the luminance value and a changing rate of the luminance gradient value in accordance with a change of the luminance based on the luminance values of the captured image and the filter coefficient of the feature detection filter;
an estimation unit configured to estimate an amount of variation of the luminance gradient value based on the derived amount of variation of the luminance value and the changing rate of the luminance gradient value in accordance with the change of the luminance value;
a threshold value deriving unit configured to derive a threshold value of the luminance gradient value to be used in detecting an image feature from an image based on the estimated amount of variation of the luminance gradient value; and
a detector configured to detect a feature from the acquired captured image using the feature detection filter based on the threshold value and a luminance gradient value obtained from the acquired captured image,
wherein the variation amount deriving unit, the calculation unit, the estimation unit, and the threshold value deriving unit are implemented by the processor.

2. The information processing apparatus according to claim 1, further comprising a filter information storage configured to store filter information on filter processing for detecting a feature from the acquired captured image,
wherein the estimation unit acquires the luminance gradient value based on the filter information, and estimates the amount of variation of the luminance gradient value based on the acquired luminance gradient value and the derived amount of variation of the luminance value.

3. The information processing apparatus according to claim 2, wherein the estimation unit derives, based on the filter information, second information indicating a relationship between a change in the luminance value and a change in the luminance gradient value, and estimates the amount of variation of the luminance gradient value based on the second information and the derived amount of variation of the luminance value.

4. The information processing apparatus according to claim 1, wherein the estimation unit estimates the amount of variation of the luminance gradient value based on the derived amount of variation of the luminance value and a preliminarily-measured relationship between an amount of variation of a luminance value and an amount of variation of a luminance gradient value.

5. The information processing apparatus according to claim 1, wherein the relationship information stored in the storage is expressed as a function of a luminance value and an amount of variation of the luminance value.

6. The information processing apparatus according to claim 1, wherein the relationship information stored in the storage is expressed as a table including a luminance value and an amount of variation of the luminance value as items.

7. The information processing apparatus according to claim 6, wherein the detector applies a filter for detecting a feature to the acquired captured image to (i) calculate a luminance gradient value for each pixel of the acquired captured image and then (ii) detect the feature based on the calculated luminance gradient value and the derived threshold value.

8. The information processing apparatus according to claim 6, wherein the detector detects an edge feature from the acquired captured image.

9. The information processing apparatus according to claim 6, wherein the detector detects a point feature or a blob feature.

10. The information processing apparatus according to claim 1, wherein the acquired captured image is one of a grayscale image, a color image, and a range image.

11. A position and orientation estimation apparatus comprising:
the information processing apparatus according to claim 1;
a second image acquirer configured to acquire an image including a target object;
a three-dimensional geometric model storage configured to store a three-dimensional geometric model of the target object;
an associating unit configured to associate an image feature detected by the detector with a feature of the three-dimensional geometric model; and
a position and orientation estimation unit configured to estimate a position and an orientation of the target object based on a result of the association by the associating unit,
wherein the associating unit and the position and orientation estimation unit are implemented by the processor.

12. A robot system comprising:
the information processing apparatus according to claim 1;
a second image acquirer configured to acquire an image including a target object;
a three-dimensional geometric model storage configured to store a three-dimensional geometric model of the target object;
an associating unit configured to associate an image feature detected by the detector with a feature of the three-dimensional geometric model;
a position and orientation estimation unit configured to estimate a position and an orientation of the target object based on a result of the association by the associating unit; and
a target object holder configured to hold the target object based on a result of the estimation of the position and the orientation of the target object by the position and orientation estimation unit,
wherein the associating unit and the position and orientation estimation unit are implemented by the processor.

13. The information processing apparatus according to claim 1, wherein the detector utilizes the feature to determine an association between a first image object and a second image object.

14. The information processing apparatus according to claim 13, wherein the first image object is an image of a component to be assembled into a product and the second image object is an image of an end effector of a robot.

15. The information processing apparatus according to claim 13,
wherein, in a case where the detector determines that a pixel of the captured image has a luminance gradient value greater than the threshold value, the detector determines the pixel as a feature and utilizes the determined feature to determine a relative measurement between the first image object and the second image object, and wherein, in a case where the detector determines that a pixel of the captured image has a luminance gradient value that is less than or equal to the threshold value, the detector excludes the pixel from being determined as a feature and from being utilize to determine a relative measurement between the first image object and the second image object.

16. The information processing apparatus according to claim 1, wherein the threshold value deriving unit sets a value greater than the estimated amount of variation of the luminance gradient values as the threshold.

17. An information processing method for an information processing apparatus, the information processing method comprising:

acquiring a captured image obtained by an image sensor that captures an image;

storing relationship information indicating a relationship between a luminance value of an image captured by the image sensor and an amount of variation of the luminance value;

deriving an amount of variation of a luminance value of respective pixels in the acquired captured image based on luminance values in the acquired captured image and the relationship information;

acquiring a filter coefficient of a feature detection filter used to detect an image feature from the captured image;

calculating a luminance gradient value which is a gradient value of the luminance value and a changing rate of the luminance gradient value in accordance with a change of the luminance based on the luminance values of the captured image and the filter coefficient of the feature detection filter;

estimating an amount of variation of the luminance gradient value based on the derived amount of variation of the luminance value and the changing rate of the luminance gradient value in accordance with the change of the luminance value;

deriving a threshold value of the luminance gradient value to be used in detecting an image feature from an image based on the estimated amount of variation of the luminance gradient value; and detecting a feature from the acquired captured image using the feature detection filter based on the threshold value and a luminance gradient value obtained from the acquired captured image.

18. A non-transitory computer-readable storage medium storing a program to cause a computer to perform an information processing method for an information processing apparatus, the information processing method comprising:

acquiring a captured image obtained by an image sensor that captures an image;

storing relationship information indicating a relationship between a luminance value of an image captured by the image sensor and an amount of variation of the luminance value;

deriving an amount of variation of a luminance value of respective pixels in the acquired captured image based on luminance values in the acquired captured image and the relationship information;

acquiring a filter coefficient of a feature detection filter used to detect an image feature from the captured image;

calculating a luminance gradient value which is a gradient value of the luminance value and a changing rate of the luminance gradient value in accordance with a change of the luminance based on the luminance values of the captured image and the filter coefficient of the feature detection filter;

estimating an amount of variation of the luminance gradient value based on the derived amount of variation of the luminance value and the changing rate of the luminance gradient value in accordance with the change of the luminance value;

deriving a threshold value of the luminance gradient value to be used in detecting an image feature from an image based on the estimated amount of variation of the luminance gradient value; and detecting a feature from the acquired captured image using the feature detection filter based on the threshold value and a luminance gradient value obtained from the acquired captured image.

* * * * *